United States Patent [19]
Tully et al.

[11] Patent Number: 5,845,432
[45] Date of Patent: Dec. 8, 1998

[54] WIRE MESH CAGE WITH SNAP-ON ROOF

[75] Inventors: Clay E. Tully, Hummelstown; William E. Askins, Lititz, both of Pa.

[73] Assignee: Woodstream Corporation, Lititz, Pa.

[21] Appl. No.: 857,047

[22] Filed: May 15, 1997

[51] Int. Cl.[6] ............................. A01M 23/02; A01K 1/03
[52] U.S. Cl. ................................ 43/61; 119/452
[58] Field of Search .................................. 43/58, 60, 61, 43/67; 119/452, 453, 459, 461, 463, 472, 474, 491, 498, 502, 507, 512, 513; 140/58; 206/389; 256/32, 47, 73, 35, 54, 56, DIG. 3

[56] References Cited

U.S. PATENT DOCUMENTS

| | | | |
|---|---|---|---|
| 1,087,264 | 2/1914 | Sheppard | 256/47 |
| 1,453,795 | 5/1923 | Hovell . | |
| 2,683,951 | 7/1954 | Hamaker | 43/61 |
| 2,965,259 | 12/1960 | Johnson . | |
| 3,834,063 | 9/1974 | Souza et al. . | |
| 3,896,766 | 7/1975 | Martin . | |
| 3,975,857 | 8/1976 | Branson et al. . | |
| 4,162,588 | 7/1979 | Wyant . | |
| 4,187,634 | 2/1980 | Kintz | 43/61 |
| 4,484,540 | 11/1984 | Yamamoto . | |
| 4,527,512 | 7/1985 | Sugiura . | |
| 4,546,568 | 10/1985 | Seyler . | |
| 4,557,067 | 12/1985 | Ha . | |
| 4,567,688 | 2/1986 | McKee . | |
| 4,682,441 | 7/1987 | Straver | 43/61 |
| 4,696,257 | 9/1987 | Neary et al. . | |
| 4,766,692 | 8/1988 | Shurden | 43/78 |
| 4,829,700 | 5/1989 | Ha . | |
| 5,177,890 | 1/1993 | Hisatomi et al. | 256/47 |
| 5,199,210 | 4/1993 | Nastas | 43/61 |
| 5,329,723 | 7/1994 | Liul . | |
| 5,549,073 | 8/1996 | Askins et al. . | |

FOREIGN PATENT DOCUMENTS 593752  3/1934  Germany .

OTHER PUBLICATIONS

Tomahawk Live Trap Company brochure; pp. 1–8 (1994).

*Primary Examiner*—Michael J. Carone
*Assistant Examiner*—Frederick T. French, III
*Attorney, Agent, or Firm*—Jacobson, Price, Holman & Stern, PLLC

[57] ABSTRACT

An animal trap of the type having a base, back wall and side walls made of metal mesh and a roof or lid made of metal sheet. A vertically sliding door is provided at the front of the trap which is held in an upper open position by a trigger mechanism until the trigger mechanism is released by an animal stepping on a bait pan inside the trap. The trap is provided with door slides snap-fitted on the opposite side walls at the front of the trap which improves the rigidity of the trap and the effectiveness of door operation. The slides are extrusions in metal or plastic, each having a first channel which snaps onto the respective side wall and a second perpendicular channel forming a guideway receiving one edge of the door. The roof is formed with inverted U-shaped flanges along its side edges defining a downwardly opening channel adapted to fit over the upper edges of the side walls of the trap housing with inwardly and upwardly extending resilient clip elements pressed into the channel so that the roof can be snap fit over the upper edges of the side walls with the free ends of the clip elements lockingly engaged under horizontal wires of the mesh side walls. The bait pan is supported by a pivot mounting which is spaced inwardly from the side walls of the trap housing and upwardly from the bottom to protect the same against damage causing distortion of the housing.

19 Claims, 11 Drawing Sheets

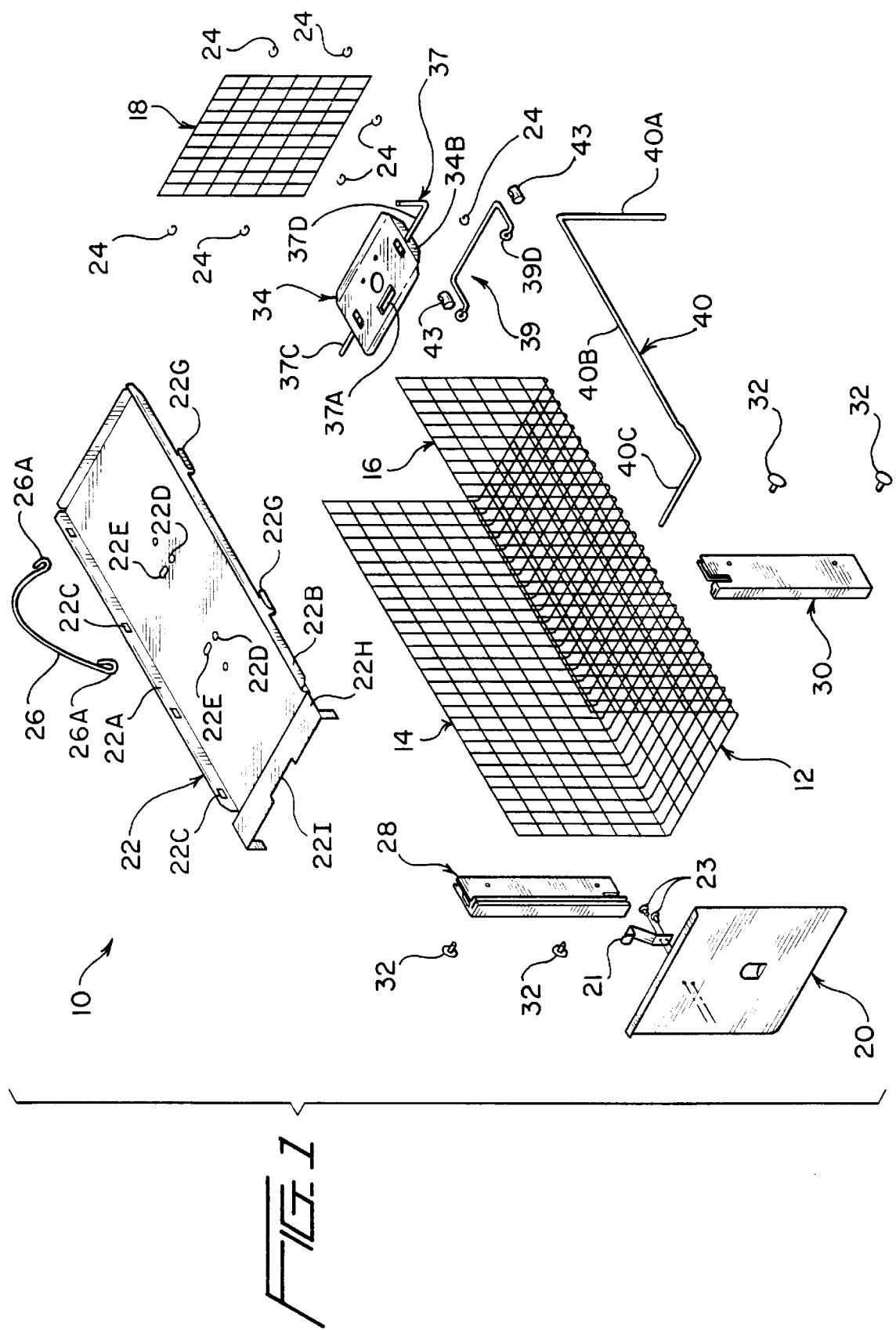

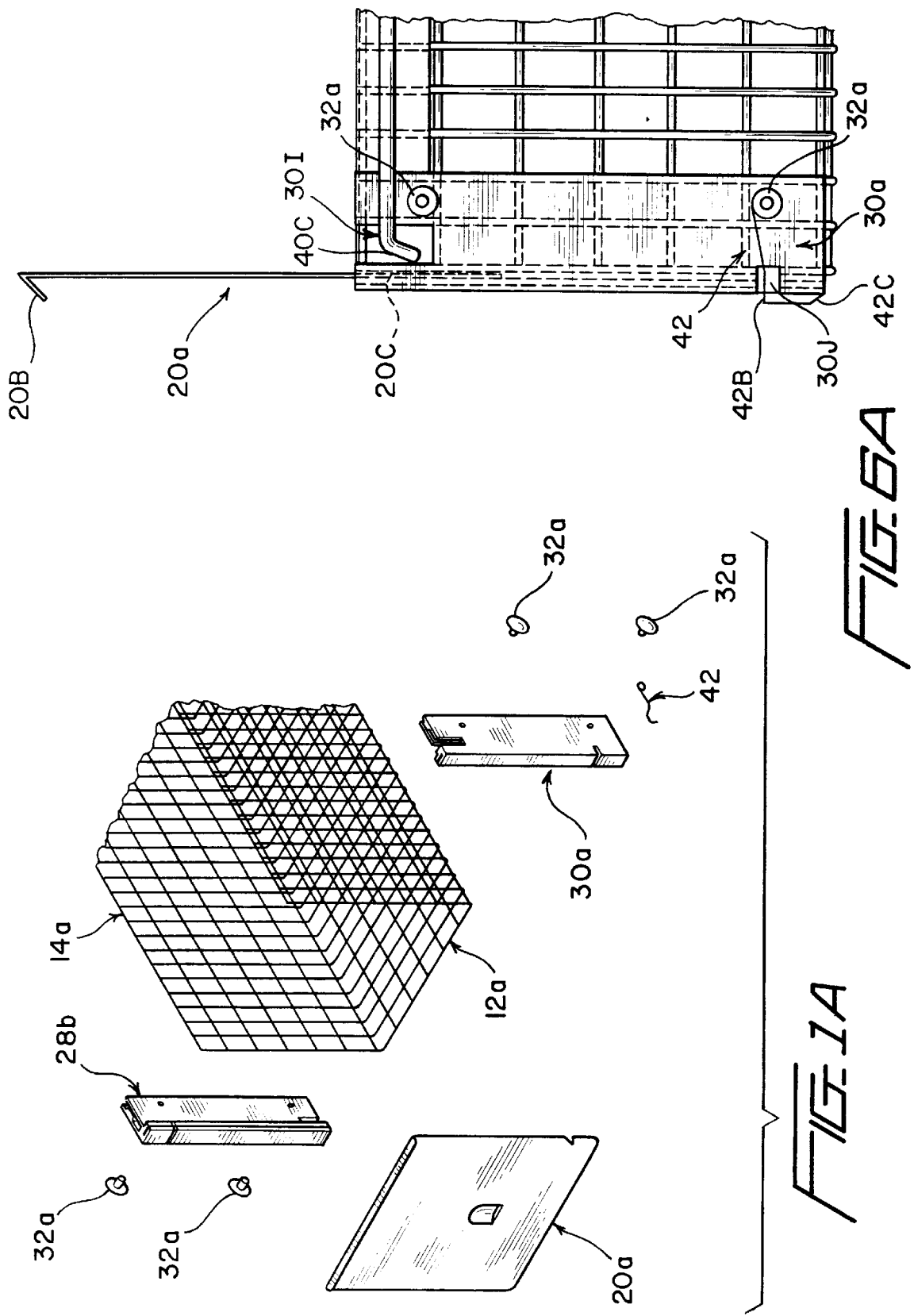

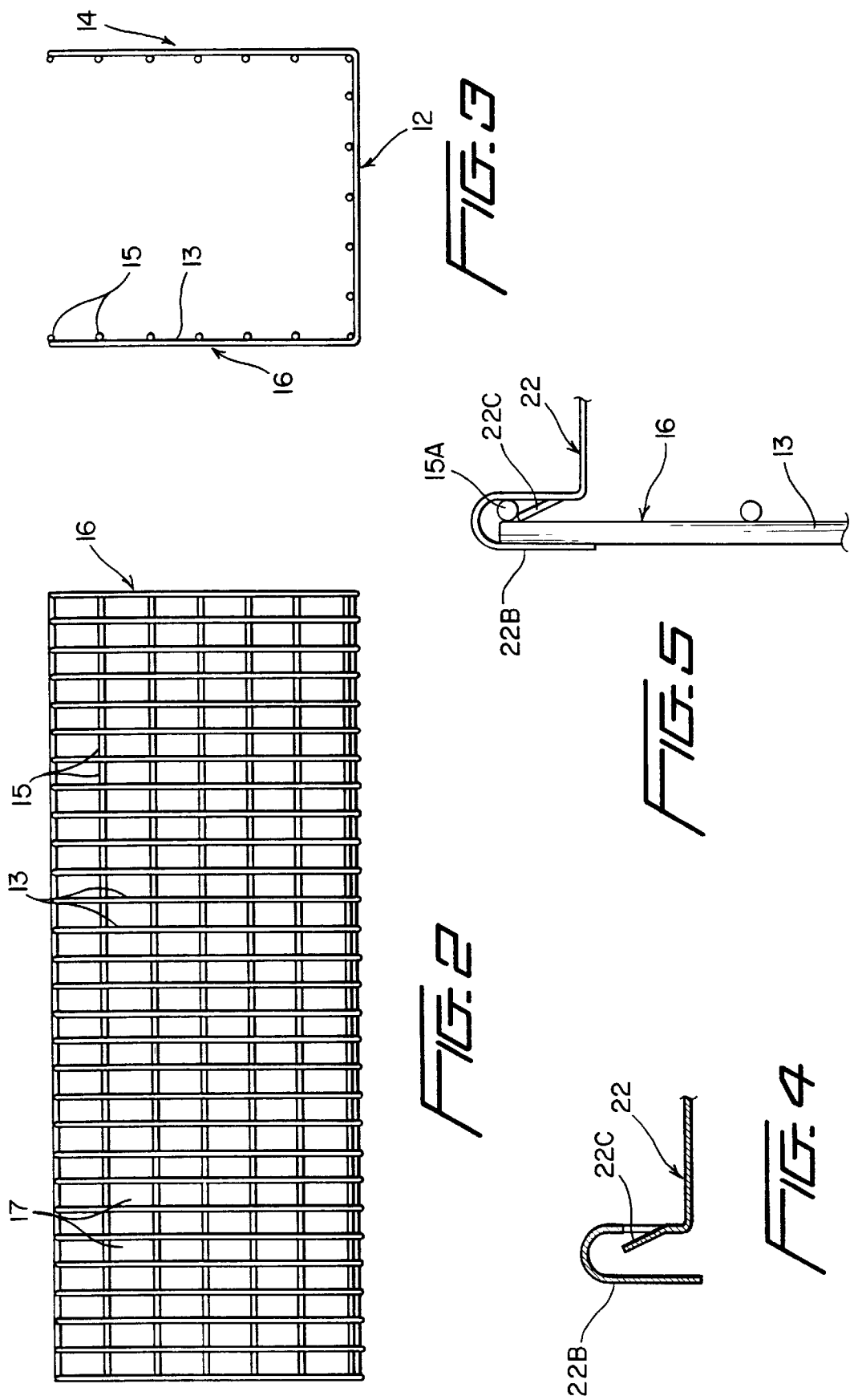

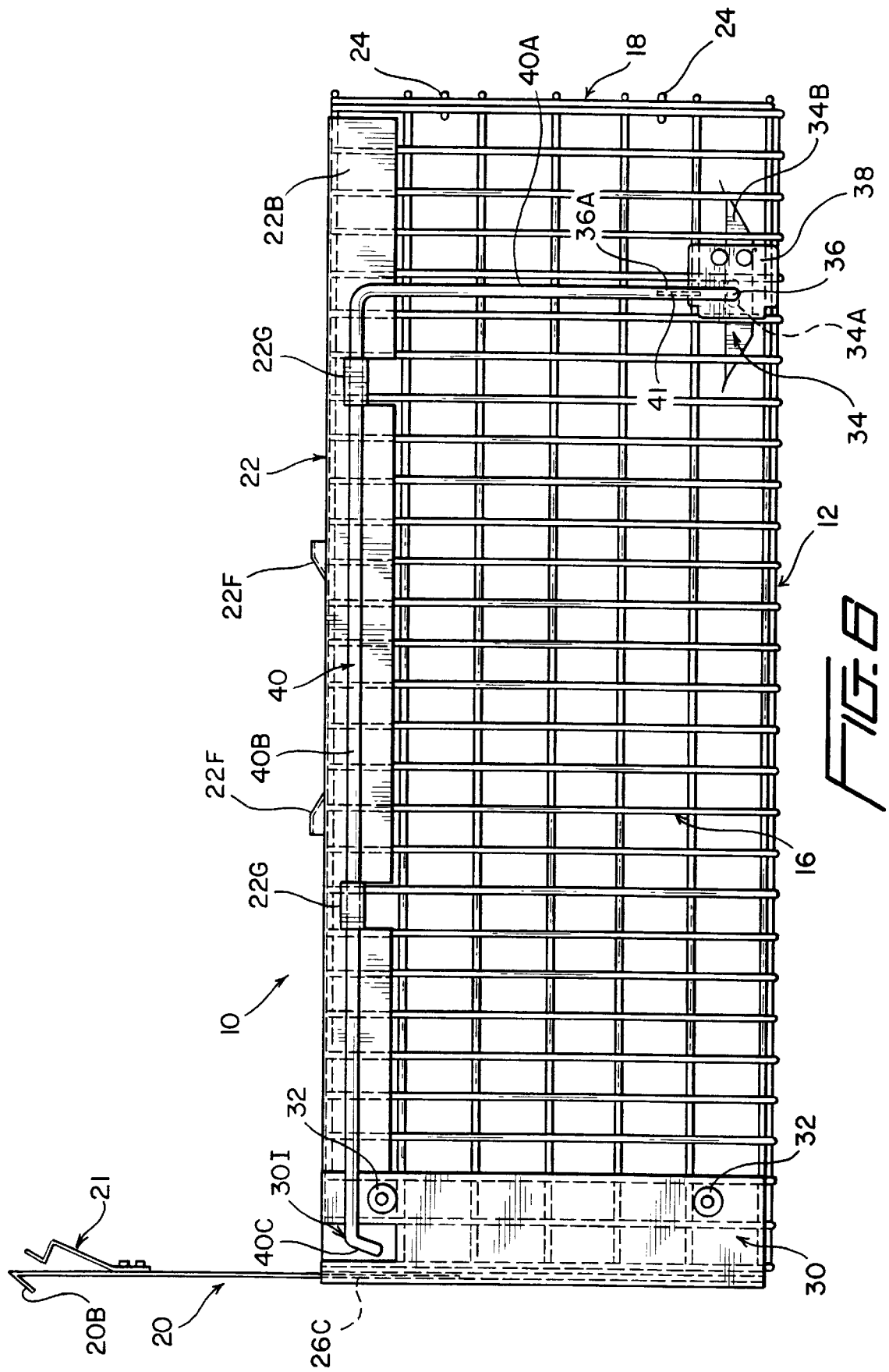

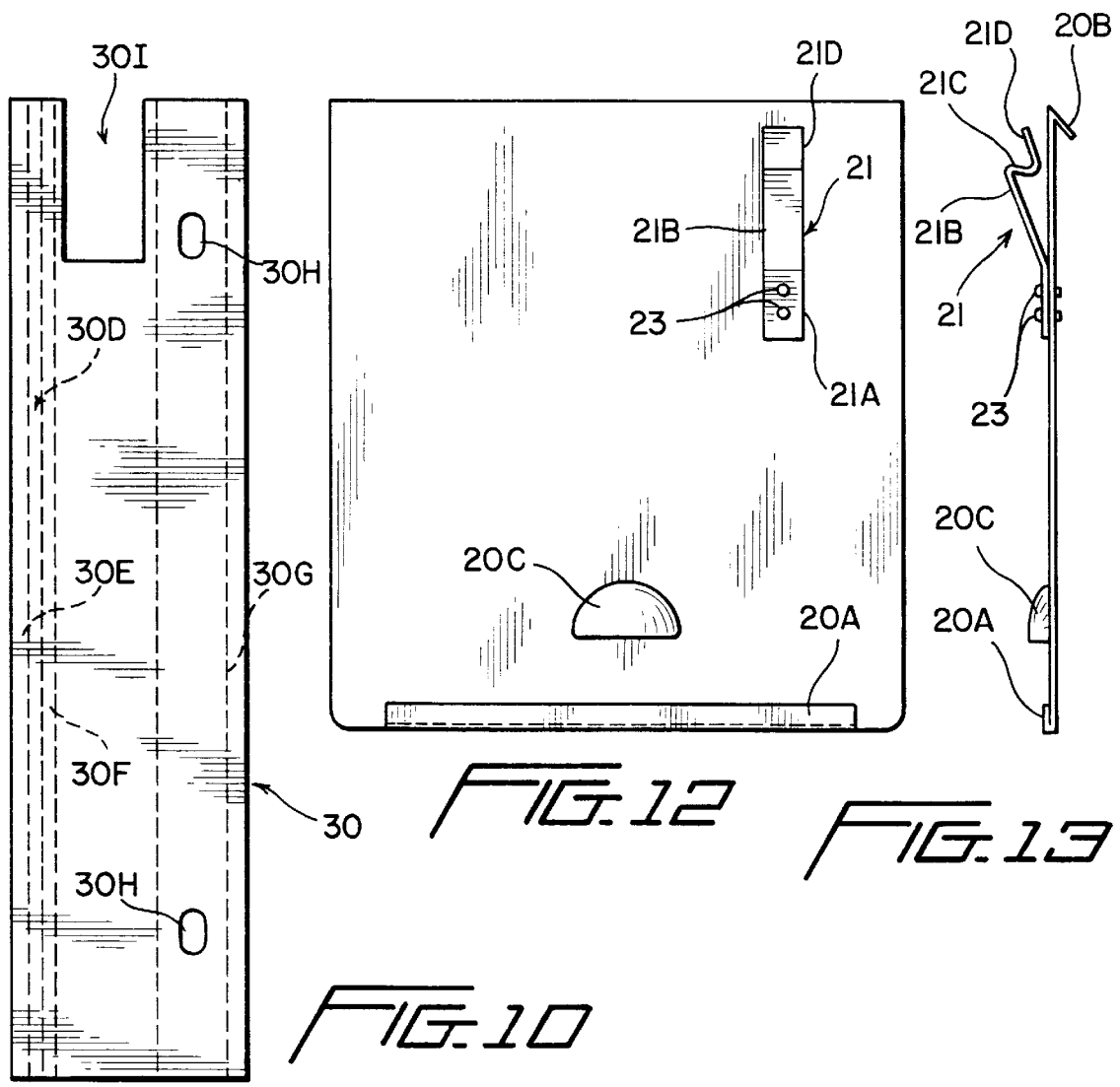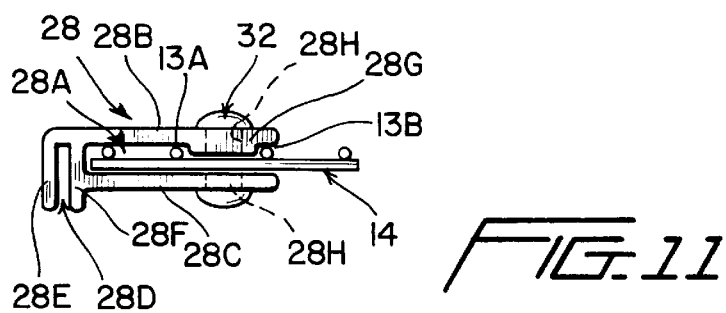

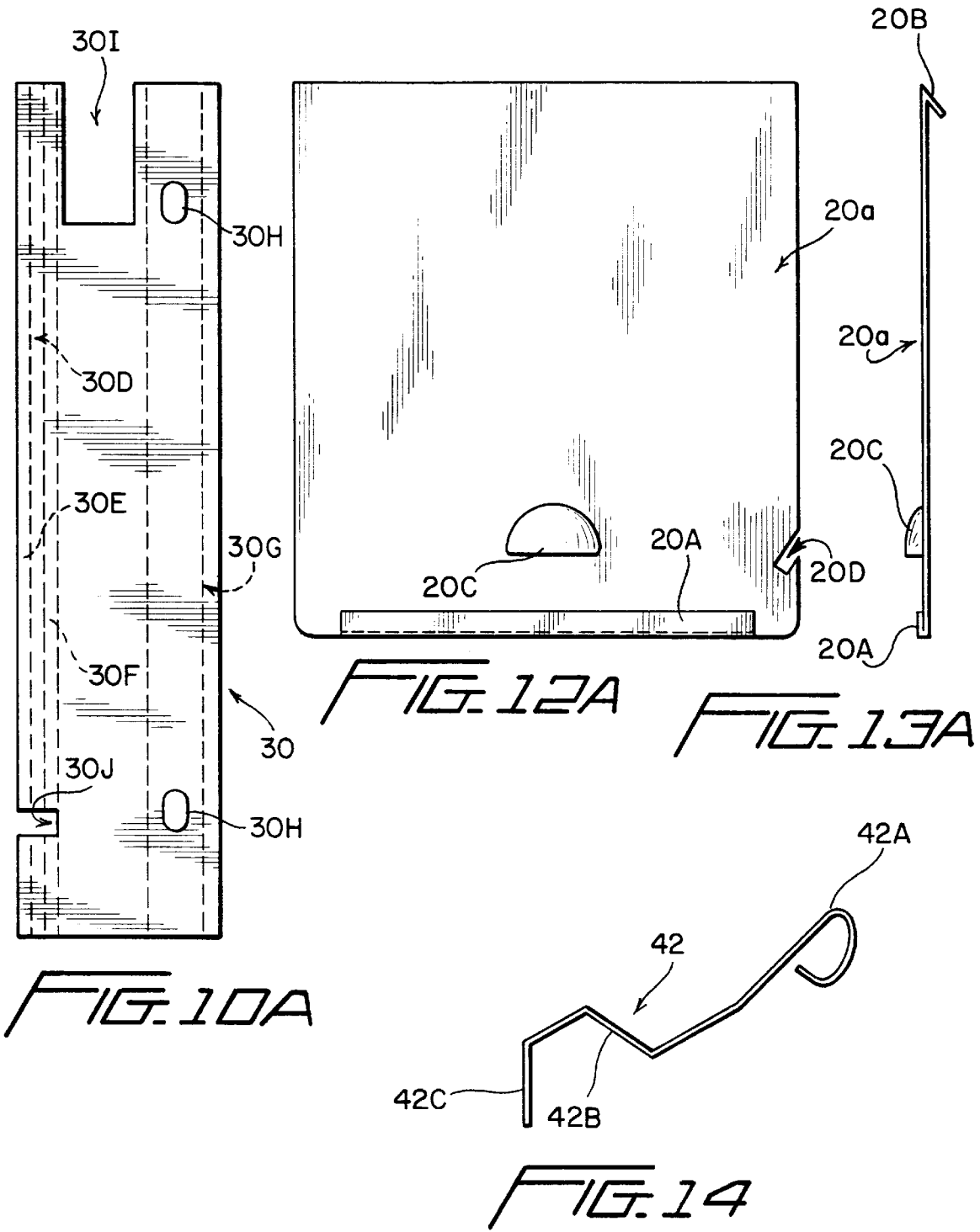

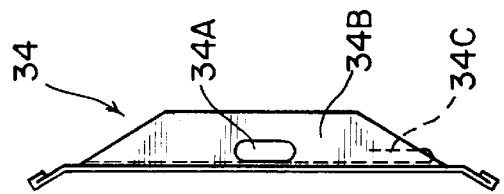
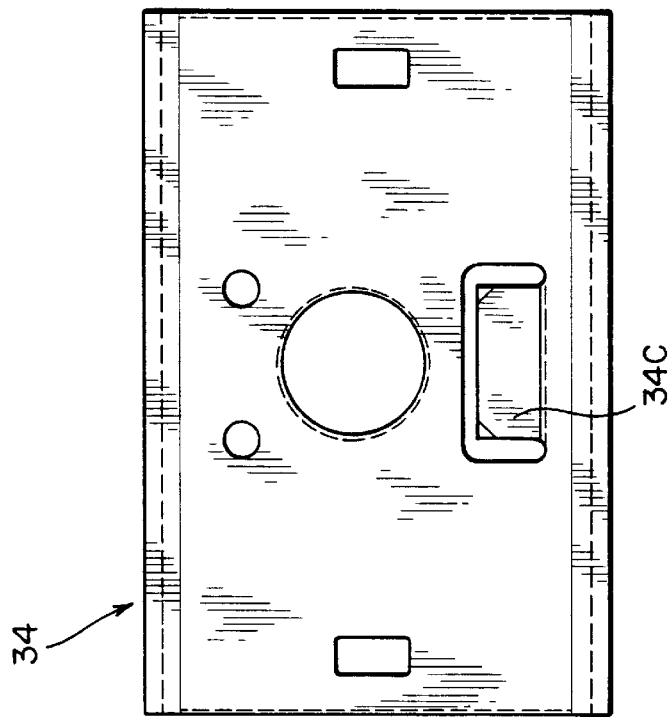
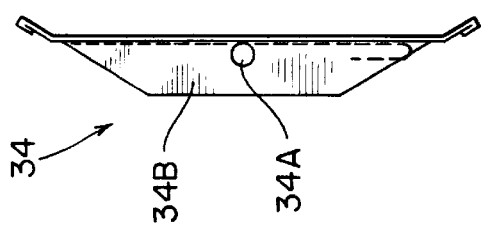

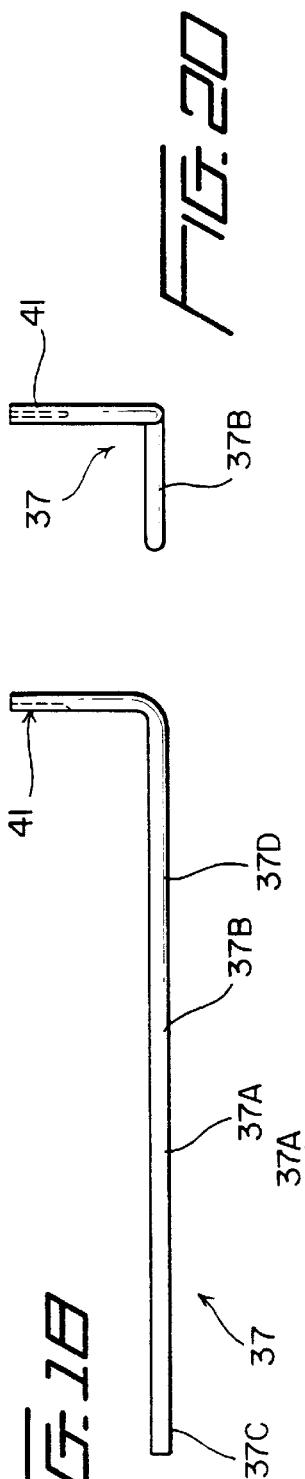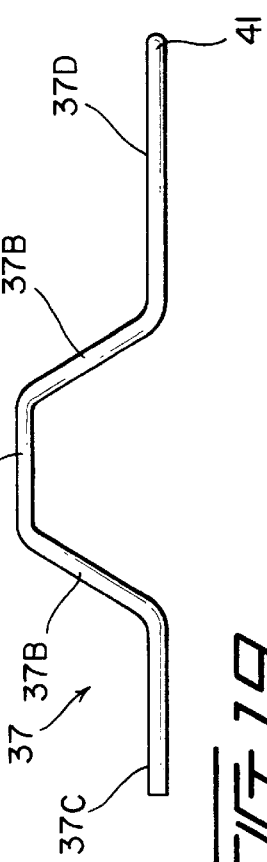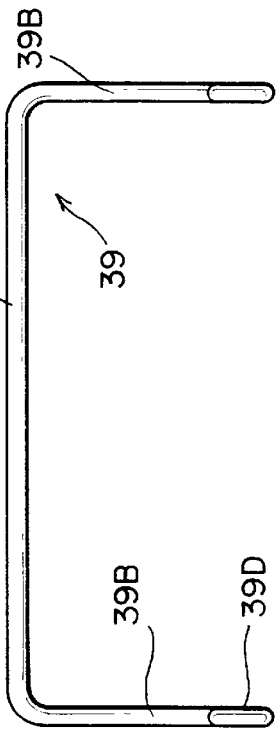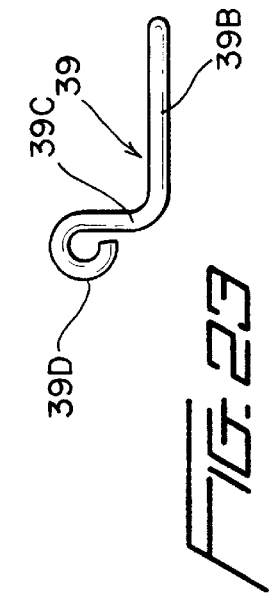
FIG.18
FIG.19
FIG.20
FIG.21
FIG.22
FIG.23

WIRE MESH CAGE WITH SNAP-ON ROOF

BACKGROUND OF THE INVENTION

This invention relates to a cage trap for small animals, the trap being of the kind having a vertically sliding door at least at one end, an internal bait pan and a trigger mechanism connected between the bait pan and the door.

Traps of the above kind are known and are operated by raising the door, in slides, to an open position, setting the door in the open position by means of the trigger mechanism and baiting the bait pan. When an animal is lured into the trap by the bait and steps on the bait pan, the trigger mechanism is sprung allowing the door to drop closed under gravity and trap the animal.

Difficulties which may be encountered in the design and construction of such traps may include, for example, obtaining sufficient rigidity consistent with simplicity, lightness of weight and ease of manufacture, particularly in the slide structure in smaller size traps, to enable the door and trigger mechanism to operate reliably. Current door slides tend to be difficult to work with and assemble and do not always provide repeatability and reliability of door closure.

Although the materials are a significant expense in the production of cage traps, labor costs in manufacturing the parts and assembling the product are important considerations. Products of this nature comprise a multiplicity of individual elements, many of which are quite small, making automated production difficult. Simplification of the manufacturing process results in improved productivity as well as more effective and dependable operation of the final product.

Cage traps of this type are often subjected to rough handling in use, sometimes resulting in distortion of the elements in a manner that affects the reliability of operation of some of the functional parts. A critical element of a cage trap, the trigger mechanism, which operates to release the door when a target animal contacts the bait pan, may be adversely affected with currently available structures.

SUMMARY OF THE INVENTION

It is an object of this invention to provide a design of cage trap which can offer a reduction in manufacturing costs and in major components, while increasing the efficiency in operation particularly of the door slide, bait tray and trigger mechanism.

Another object of the invention is to provide a trap of the kind described which has an improved door slide structure.

Still another object of the invention is to provide a cage trap which offers simplifications in assembly while producing improved rigidity in use.

A further object of this invention is the provision of a roof or lid element preformed for snap-on attachment to the upper edge portions of the metal mesh material of the cage side walls.

Yet another object of this invention is the provision of a cage trap comprising an improved bait pan or treadle supporting means which is protected by the cage housing and less likely to be adversely affected by distortion to the housing caused by damage to the trap.

In fulfillment of the above and other objects, an important feature of the improved cage trap structure of this invention comprises the nature of the slides which are provided at opposite sides of the trap to support a vertically sliding door. According to this invention, the preferred slides comprise lengths of extruded material, such as an extruded polymer or metal, e.g., PVC or aluminum, which fit onto the sides of the trap in a unique manner providing enhanced rigidity. The extruded slides are designed effectively to snap onto the edge portions of the wire mesh material forming the side walls of the trap cage and are of unique design including, in a preferred form, a first snap-on channel to grip the wall of the trap and a second door-receiving slide channel perpendicular to the first channel.

The slides hold the door rigidly due to their unique method of fixture to the walls of the trap. The manner of fixing the slides provides the trap with enhanced rigidity and repeatability of door actuation. The structure enables vertical drop door-type traps to be made in small sizes.

The trap preferably also includes a sensitive trigger mechanism which rotates forward or back in an "X" plane, releasing a trigger rod which rotates in a "Y" plane, releasing the vertical gravity drop door to slide down the slides in a "Z" plane.

The preferred trigger mechanism of the trap of this invention also includes a unique supporting means for pivotally carrying the bait tray and attaching the same to the cage structure in a manner which positions the pivotal supports inwardly of the side walls and above the cage bottom to avoid damage resulting from distortion of the cage walls in use. Such a construction is simple to assemble and reliable in use. This bait tray support mechanism, while particularly useful with the other components of the cage trap disclosed herein such as the improved door slides, will find separate utility in any cage trap comprising a pivotal support for a bait pan trigger mechanism.

Another constructional feature of the preferred cage trap of this invention, which may also be used with other wire mesh cage constructions or the like, is the unique manner in which the sheet-like roof or top element is designed to snap onto the wire mesh elements without requiring separate connecting elements or tools as are necessary with prior art constructions.

Additional features and advantages of the invention will be apparent from the ensuing description and claims read in conjunction with the attached drawings.

BRIEF DESCRIPTION OF THE DRAWINGS

FIG. 1 is an exploded perspective view of a preferred embodiment of the individual elements comprising a cage trap according to this invention;

FIG. 1A is a fragmentary exploded perspective view of modified door and slide elements incorporating an alternative door latching mechanism;

FIG. 2 is a side elevational view of the integrally formed base and side wall member;

FIG. 3 is an end elevational view of the base and side wall member;

FIG. 4 is an enlarged fragmentary cross-sectional view of an edge portion of the preferred roof member, showing integral clip elements used to secure the roof member to the upper edge portions of the side walls;

FIG. 5 is a fragmentary side elevational view illustrating the manner in which the clip elements of the roof member are engaged with the wire mesh at the upper edge portions of a side wall of the cage housing;

FIG. 6 is a side elevational view of an embodiment of a cage trap according to this invention with the door held in its open position, an alternate bait trap support and handle assembly being illustrated in this embodiment for illustrative convenience;

FIG. 6A is a fragmentary side elevational view of a portion of a trap incorporating the alternative door latching mechanism of FIG. 1A;

FIG. 10 is an enlarged side elevational view of a preferred door slide according to this invention;

FIG. 10A shows the slide modified for use with the alternative door latching mechanism of FIG. 1A;

FIG. 11 is an end view of the slide showing the manner in which it is secured to a side wall of the trap housing;

FIG. 12 is a rear elevational view of the door of the cage trap;

FIG. 12A shows the door structure adapted for the modified latching mechanism;

FIG. 13 is a side elevational view of the door;

FIG. 13A is a side elevational view of the door of FIG. 12A;

FIG. 14 is an isometric view of a wire door catch member;

FIG. 15 is a top plan view of a bait pan used in the cage trap of the instant invention;

FIG. 16 is an end elevational view thereof from one end;

FIG. 17 is an end elevational view of the bait pan from the opposite end;

FIG. 18 is a side elevational view of a pivot rod element of the preferred trigger assembly used with the cage trap of the instant invention;

FIG. 19 is a top plan view of the pivot rod element;

FIG. 20 is an end elevational view thereof;

FIG. 21 is a top plan view of the preferred bait pan pivot rod support member of the instant invention;

FIG. 22 is a side elevational view of the support member of FIG. 21; and

FIG. 23 is an end elevational view thereof.

DESCRIPTION OF THE PREFERRED EMBODIMENTS

Figure 7:
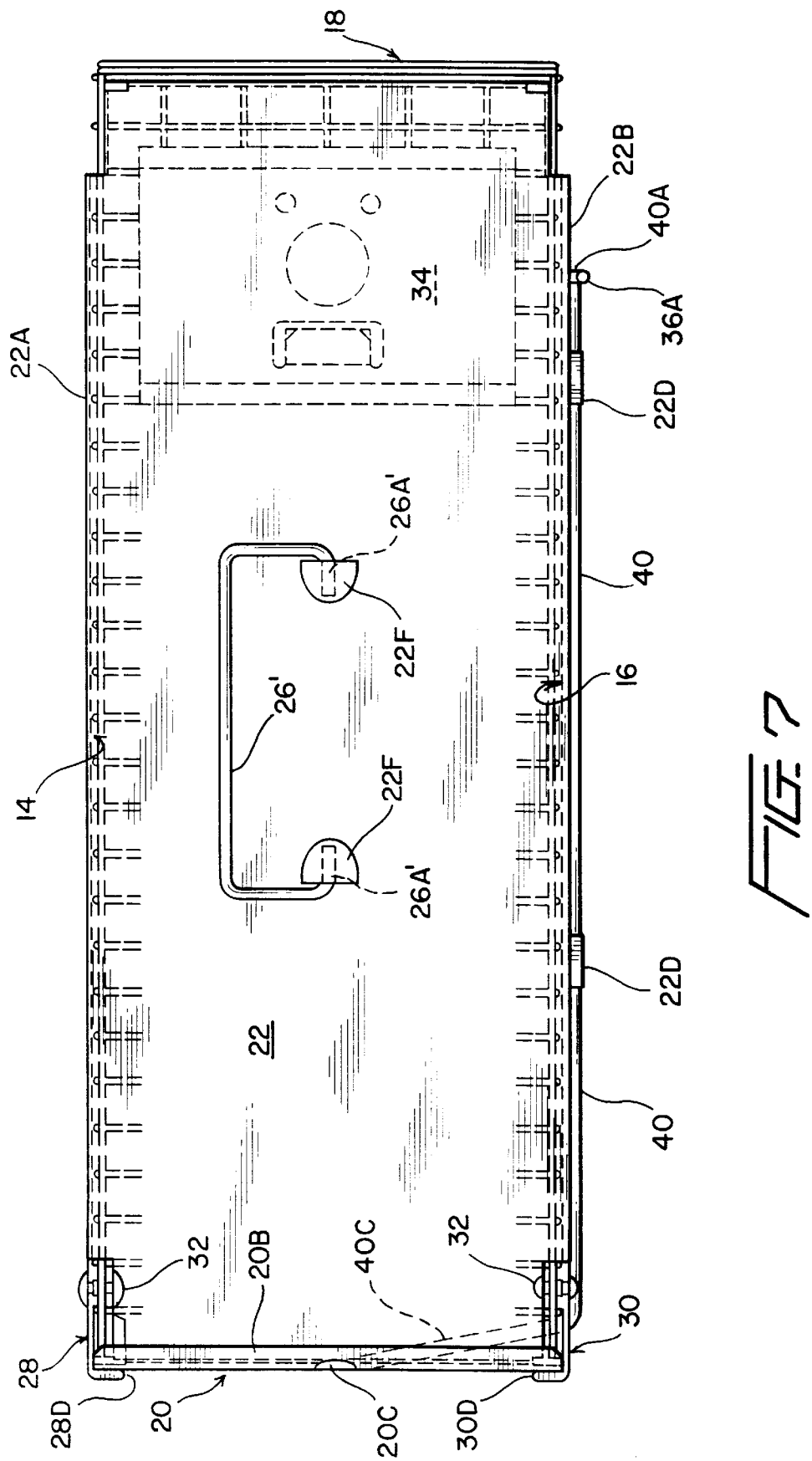
FIG. 7 is a top plan view of the trap shown in FIG. 6.
Figure 8:
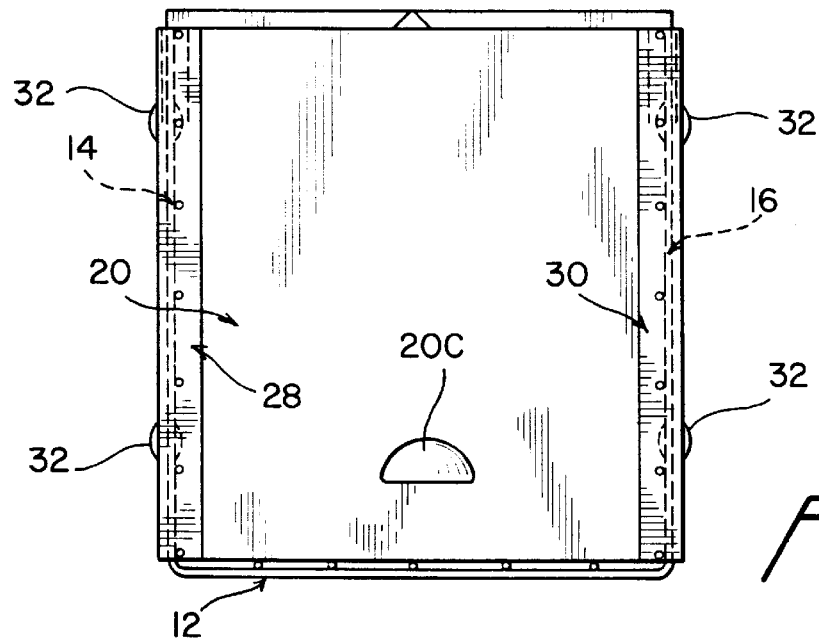
FIG. 8 is an elevational view of one end of the trap of FIG. 6 with the door closed.

The preferred animal cage trap 10 illustrated in FIG. 1 comprises an elongate base 12, side walls 14, 16, and end wall 18 closing the trap at one end, a sliding door 20 at the other end of the trap, and a roof or lid 22.

As seen particularly in FIGS. 2 and 3, in the preferred form of the invention, the base 12 and side walls 14, 16 are integrally formed from a single piece of metal mesh including wire elements 13, 15 welded at their crossing points to form generally rectangular apertures 17, with the side walls bent up at right angles from the base. End wall 18 may also be formed of like welded wire mesh and may be attached to the side walls and base by wire rings 24 or other suitable attachment means in a well known manner.

Roof 22 may be stamped from metal sheet and, according to an important feature of the instant invention, may have upwardly and downwardly bent flanges 22A, 22B along the sides which fit over the top edges of the side walls 14, 16, respectively. As seen particularly in FIGS. 4 and 5, the inner wall of each flange is preferably provided with a plurality of spaced clip elements 22C for securing the roof to the side walls 14, 16. The clip elements 22C comprise U-shaped cuts formed in the inner wall of the flanges 22A, 22B during formation of the roof 22, and are pressed inwardly as shown in FIGS. 4 and 5 about their lower edge which is integral with the material of the roof 22. Since the roof is formed of a relatively light-weight metal, the flanges 22A, 22B can be readily pushed down or snapped over the upper portions of the side walls 14, 16, with the clip elements 22C riding over the uppermost wire element such as shown at 15A in FIG. 5, and then snapping back beneath the wire element 15A to lock the roof 22 onto the side walls 14, 16. This particular construction enables the cage trap to be assembled quickly and easily without the need for separate connecting elements such as the wire rings 24 used to connect the end wall 18 to the side walls 14, 16 and base 12.

While the foregoing assembly technique is particularly useful in the cage trap of the instant invention, it will be readily recognized that this snap-on construction will have broader utility, enabling a sheet element formed of metal or a polymer material to be quickly and securely attached to a wire mesh element without requiring extraneous connectors or tools such as pliers or the like.

In FIG. 1, the roof 22 is shown as including two pairs of apertures 22D, 22E for reception of looped end portions 26A of a bent wire handle 26. The openings 22E are elongated to facilitate engaging the looped end portions 26A of the handle 26 with the roof 22 to pivotally attach the handle 26 thereto in an obvious manner.

An alternate form of handle is shown at 26' in the embodiment of FIG. 7, wherein the roof has been provided with upsets 22F to pivotally receive inwardly bent end portions 26A' of the handle 26'.

The following discussion focusses primarily on the improved slide construction for the trap door of the instant invention. In this respect, at the door-end of the trap, the side walls 14, 16 are framed by respective door slides 28, 30 best shown in FIGS. 10 and 11, each of which is cut to length from an extrusion of a polymer material such as PVC or a metal such as aluminum. The slides 28, 30 may be identical in construction for manufacturing simplicity, simply being inverted for use on opposite sides of the door.

By reference to the profile (cross-section) shown in FIG. 11, it will be recognized that the slide comprises a first channel 28A defined by elongated limbs 28B, 28C and a second channel 28D perpendicular to channel 28A and defined by limbs 28E, 28F, limb 28F also defining the base of channel 28A. Further, limb 28B includes an inwardly directed boss or rib 28G.

As illustrated in FIG. 11, slide 28 fits onto the edge portions of side wall 14 of the trap with a snap-type fit, so that boss 28G fits between a pair of the vertical wires 13A, 13B to positively locate slide 28. When attached to side wall 14 as described, channel 28D of the slide faces inwardly and forms the actual slide or guideway for one edge of door 20.

If the slides are formed of PVC or the like, they may each be provided with a pair of apertures 28H to receive rivets 32 which secure the slides to the respective side walls of the trap. The use of rivets is generally not necessary with slides formed of extruded aluminum or the like.

It is understood that slide 30, being formed of the same extrusion, is of like configuration to slide 28, and like suffixes are used for the reference numerals denoting its equivalent elements. Slide 30 snaps onto the edge portions of wall 16 in like manner and provides a guideway 30D for the opposite edge of door 20.

Door 20 (see FIGS. 12 and 13) comprises a sheet metal stamping, the opposite edges of which can slide freely up and down in the respective guideways 28D and 30D of slides 28 and 30. The door 20 is provided with a tightly crimped skirt 20A along the bottom and an oppositely bent lifting flange 20B at the top. A semicircular upset 20C is provided centrally of the door near the bottom to form a stop for portions of a trigger mechanism to be described in more detail below.

In the preferred embodiment, a spring steel latch 21 is secured at a straight proximal end portion 21A to the inside surface of the door 20 by a pair of permanent rigid fasteners such as the rivets 23, screws and nuts (not shown), or the like. The latch 21 includes an angularly offset arm 21B biased away from the door 20. The arm 21B is bent back to form a shoulder 21C and terminates at an upstanding finger-engaging flange 21D at its distal end. When the door 20 is fully closed, the shoulder 21C underlies the end portion 22H of the roof 22 to preclude an animal captured within the trap 10 from escaping by sliding the door 20 upwardly. To release an animal, or to set the trap, the finger-engaging flange 21D is pressed toward the inner surface of the door 20 so that the latch 21 will pass through a notch 22I formed in the end portion 22H of the roof 22 as the door 20 is raised. When the door 20 is released from its set position to drop by gravity as discussed below, the angularly offset arm 21B rides over the portions of the roof forming the notch 22I and is then biased toward its original position so the shoulder 21C snaps under the end portion 22H of the roof 22 to again latch the door 20 in its closed position.

Inside of the trap, close to end wall 18, there is provided a bait pan or treadle 34, the details of which are seen in FIGS. 15–17. In a more conventional mounting arrangement as shown primarily in FIGS. 6 and 7, a pivot rod 36 may be mounted in brackets 38 attached to the respective side walls 14, 16 of the trap, the pivot rod 36 passing through apertures 34A in downwardly turned flanges 34B on each side of the bait pan 34 to pivotally support the same.

While the mounting arrangement seen in FIGS. 6 and 7 is functional, even for the purposes of the cage trap of this invention, a preferred mounting arrangement is shown in FIG. 1 and, in more detail, in FIGS. 18–23. This mounting arrangement comprises a bent wire pivot rod 37 illustrated in FIGS. 18–20, pivotally carried by a wire form mounting bracket 39 illustrated in FIGS. 21–23. With this preferred arrangement, the support element 39 is generally U-shaped, comprising a cross bar 39A and a pair of arm members 39B, each of which include upstanding end portions 39C terminating in eyes or loops 39D. The leg elements 39B and/or the cross bar 39A may be secured to wire elements of the base 12 by clips 43 and/or wire rings 24 shown in the exploded view of FIG. 1.

The pivot rod 37 comprises a central bight portion 37A connected by angular arms 37B to leg portions 37C and 37D, respectively. The leg portions 37C and 37D of the pivot rod 37 are received through the eyes 39D of the mounting element 39, with the ends of the leg portions 37C and 37D engaged in apertures 34A formed in down turned flanges 34B on the side of the bait pan 34. The bight portion 37A of the pivot rod 37 is captured beneath the bait pan 34 by an offset flange portion 34C pressed from the metal of the bait pan. See FIGS. 1 and 15–17. In this manner, when the bait pan 34 is tripped as by engagement with an animal, it can pivot about the axis passing through the aligned pivot rod leg portions 37C, 37D supported in the eyes 39D of the support member 39.

The modified means for pivotally supporting the bait pan shown in FIGS. 1 and 15–23 has the advantage of securing the bait pan in a manner that is less likely to be damaged in use. With a construction such as shown, for example, in FIGS. 6 and 7, any significant distortion of the side walls 14, 16, or the brackets 38, may well preclude proper operation of the trigger mechanism. In contrast, the preferred support mechanism of the instant invention is quite sturdy, and removed from the side walls of the cage, which are most likely to be subjected to damage in use. Effectively, the eyes 39D of the modified mounting member 39 shown in FIGS. 21–23 are offset inwardly and upwardly from the side and bottom walls, respectively, of the cage.

Figure 9:
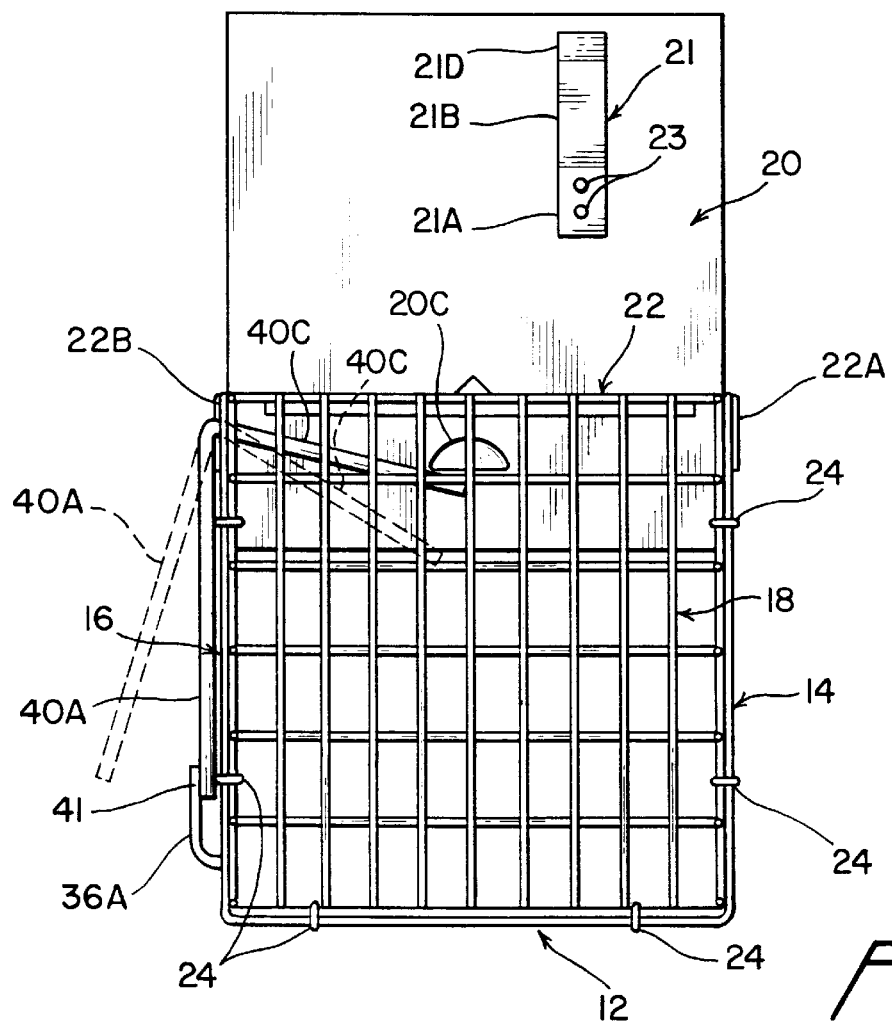
FIG. 9 is a view from the opposite end of the trap with the door open, e.g., with the trap set, showing in dashed lines the movement of the trigger rod as the door is released.
Figure 8A:
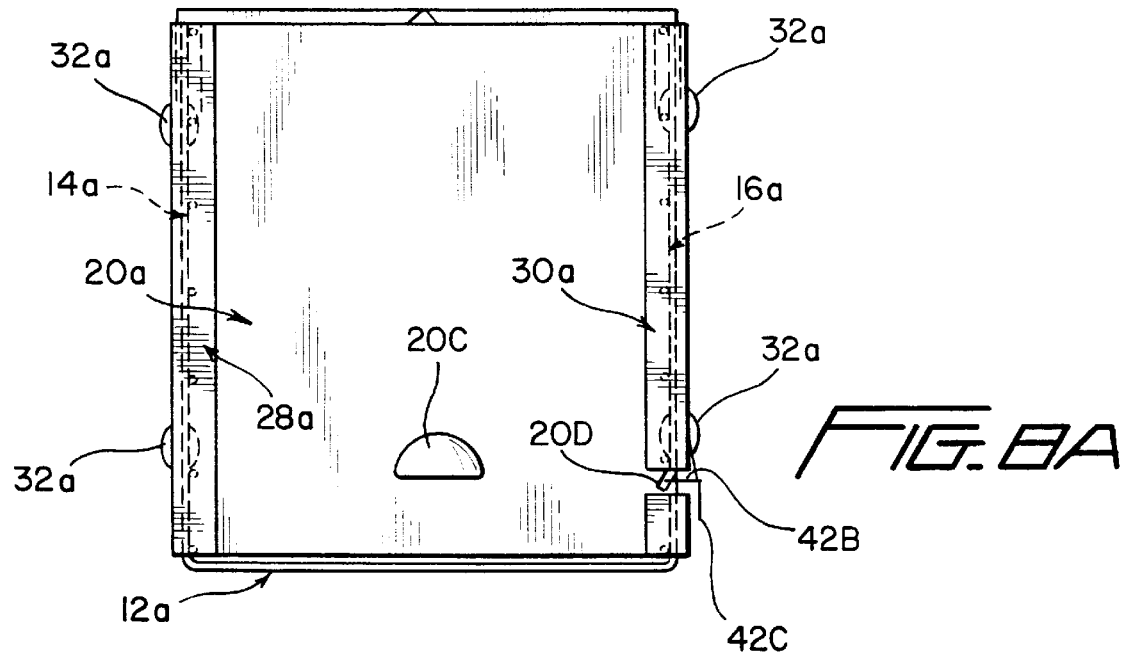
FIG. 8A is a similar view with the modified door latching mechanism of FIG. 1A.
Figure 9A:
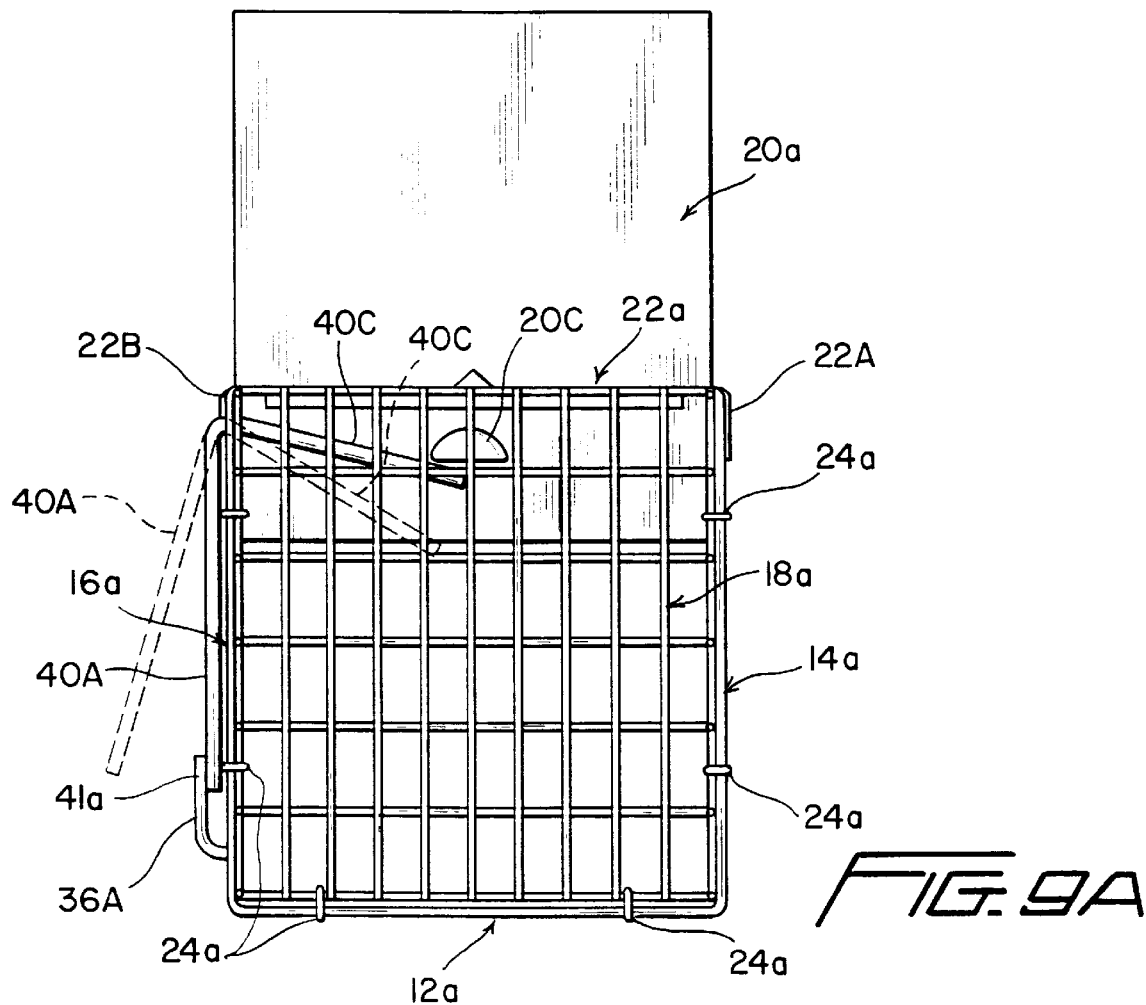
FIG. 9A is a similar view of a trap with the modified door latching mechanism.

With either embodiment, the end portion of the pivot rod is extended outwardly from side wall 16 of the cage trap and has a turned up end portion 36A to cooperate with a trigger rod 40 when the bait pan 34 pivots in an "X" plane. Trigger rod 40 includes an elongated central portion 40B rotatably supported in journals 22G formed by curled portions of flange 22B of the roof so that rod 40 can pivot in a "Y" plane (see FIG. 9). The journals 22G may be cut from portions of the flange 22B as seen in FIGS. 6 and 7 or formed from extensions of the flange 22B as seen at 22G in FIG. 1.

At its bait pan end, rod 40 has a downwardly bent end portion 40A vertically aligned with the bait pan axis, i.e., the axis of pivot rod 36 or the aligned leg portions 37C, 37D of pivot rod 37. Portion 40A of rod 40 may be provided with an elongate impressed detent (not shown) to receive the end portion of the pivot rod, but it is preferred to provide a detent 41 in the turned up end portion of the pivot rod itself to receive portion 40A of the pivot rod 40.

At its opposite end, rod 40 has an inwardly bent section 40C which projects into the trap so that its end can engage under the upset or stop 20C in door 20 to hold the door in the elevated set position as will be described. To provide passage for the inwardly bent section 40C of rod 40 and accommodate its pivotal motion slide 30 is formed with a cut-out 30I at its upper end.

By reference to FIGS. 1A, 6A, 8A, 9A, 10A, 12A, 13A and 14, an alternate latching means is illustrated wherein parts similar to the previous embodiment have been identified by the same reference numeral followed by the suffix "a". In the modified embodiment, for releasably latching the door in the closed position a spring wire catch 42 is provided having a looped end 42A which seats on rivet 32a at the bottom end of slide 30a. Catch 42 inclines downwardly from the rivet to a rectangular catch portion 42B that fits in a second cut-out 30J in slide 30a. The catch is resiliently urged inwardly against the respective side edge of door 20a and snaps into an inclined notch 20D provided in the door 20a when the door closes so as to latch the door in the closed position, preventing it from being opened by a trapped animal or by the trap falling over. Catch 42 terminates in a finger hold 42C by which it can be removed from notch 20D against the spring action. In order to set the embodiment 10a of the trap, catch 42 is removed from notch 20D so that the door 20a can be raised.

With either latching mechanism, once the door is raised, the end section 40C of rod 40 can be engaged under the stop 20C while the opposite end section 40A of rod 40 is engaged and held behind turned up end portion 36A or 37A of the pivot rod 36 or 37 for the bait pan 34. See, for example, the solid line showing in FIG. 9. When an animal enters the trap and steps on the bait pan, the end portion of the pivot rod swings away from end section 40C of rod 40 (in the "X" plane), allowing rod 40 to pivot in journals 22D (in the "Y" plane) under the weight of the door, thereby swinging to the dotted line position in FIG. 9, releasing the door which slides closed under gravity (in a "Z" plane) reengaging shoulder 21C or catch 42 to hold the door closed.

In the inventive trap, slides 28, 30 hold the door rigidly due to their unique method of attachment to the mesh side walls of the trap. This method of attachment provides the trap with enhanced rigidity and repeatability of door operation. The design allows the trap to be inexpensive and simple to assemble while reducing the number of components required.

Although the cage trap disclosed herein is shown as a single-door construction, and the features of this invention are particularly adapted to smaller cage traps in which only one end provides access to target animals, with modifications obvious to those skilled in the art, the instant inventive concepts can readily be adapted to operate sliding doors at both ends of the trap.

In modified forms of the invention, the roof of the trap, which is used both as a protective barrier for the trapper and as a structural element of the trap can be made from mesh or as a thermoform material or a stamping. The door can be mesh rather than solid. The trap can be made to be a wholly snap together structure and can thus be made in a knock-down version.

While only preferred embodiments of the invention have been described herein in detail, the invention is not limited thereby and modifications can be made within the scope of the attached claims.

We claim:

1. In a product including a first panel formed of a sheet-like material generally defining a first plane, and a second panel formed of a mesh-like material generally defining a second plane, wherein the mesh-like material has elongated edge portions with at least one raised element extending therealong, the first panel being connected to the edge portions of the second panel with the plane of the first panel extending at an angle to the plane of the second panel, the improvement comprising the connection between the first and second panels including portions of the first panel defining an elongated, generally U-shaped, channel engaged over the edge portions of the second panel, the U-shaped channel being formed by a pair of spaced legs interconnected at one end by a bight portion and open at the end opposite to said bight portion to receive the edge portions of the second panel, at least one finger element having one end connected to one of said legs and extending into said channel at an angle toward the opposite leg and said bight portion, said finger element including free end portions underlying the raised element on the second panel to preclude disengagement of the first and second panels, the portions of the first panel defining said channel and said finger element including resilient parts enabling said channel and finger to be snap-fit over the raised element on the edge portions of the second panel to interlock the first and second panels without the need for extraneous connecting elements and/or tools.

2. A product as claimed in claim 1, wherein the planes of the first and second panels extend generally perpendicularly to each other.

3. A product as claimed in claim 2, wherein the portions of the first panel defining said channel are edge portions whereby the connection between the first and second panels form a corner portion of the product.

4. A product as claimed in claim 3, comprising a third panel formed of a mesh-like material having elongate edge portions with at least one raised element extending therealong, portions of the first panel defining a further channel, said further channel being engaged over the edge portions of the third panel and including at least one finger element having free end portions underlying the raised element of the third panel to preclude disengagement of the first and third panels and to form a further corner portion of the product spaced from the corner portion formed by the connection between the first and second panels.

5. A product as claimed in claim 4, wherein the second and third panels comprise side walls of a cage-like housing and the first panel comprises the roof of the housing.

6. A product as claimed in claim 5, wherein the housing is an animal cage.

7. A product as claimed in claim 1, wherein the second panel is formed of a multiplicity of first and second wire-like elements interconnected to each other at their crossing points to define a multiplicity of apertures, and the raised element comprises one of the wire-like elements.

8. A product as claimed in claim 7, wherein the second panel is formed of welded wire mesh.

9. A product as claimed in claim 4, wherein the second and third panels are formed of a multiplicity of wire-like elements interconnected to each other at their crossing points to define a iultiplicity of apertures, and the raised elements comprise one of the wire-like elements of each panel.

10. A product as claimed in claim 9, wherein the second and third panels are formed of welded wire mesh.

11. A product as claimed in claim 1, wherein the first panel comprises a sheet of metal with portions bent to define said channel.

12. A product as claimed in claim 11, wherein said fingers are formed by U-shaped cut portions of said one leg bent into said channel.

13. A product as claimed in claim 5, wherein the first panel comprises a sheet of metal with portions bent to define said channel and said further channel.

14. A product as claimed in claim 13, wherein said fingers are formed by U-shaped cut portions of said one leg bent into said channel and said further channel.

15. In an animal cage comprising a base, a roof, opposed side walls and opposed ends, wherein the side walls are formed of wire elements interconnected to each other at their crossing points to define a multiplicity of apertures, the upper edge portions of each of the side walls including at least one elongated wire element extending therealong in juxtaposition to the upper edge thereof, the roof being formed of a sheet metal panel having spaced side edge portions secured to the upper edge portions of the side walls, the improvement comprising a pair of elongated, inverted, generally U-shaped, downwardly opening channels formed in the side edge portions of the roof panel, each of said channels being formed by a first upwardly bent leg and a second downwardly bent leg interconnected at the top by an integral bight portion, said channels being engaged over the upper edge portions of the side walls with the upwardly bent legs inside of the side walls and the downwardly bent legs outside of the side walls, at least one upwardly and inwardly extending finger element pressed into each of said channels from the material of one of the legs forming the respective channel, said finger elements having free end portions underlying portions of the elongated wire element of the respective side wall to preclude disengagement of the side walls and the roof, the sheet metal of the roof panel being sufficiently resilient to permit the finger elements to ride over the wire elements of the side walls, whereby the roof can be snap-fit to the side walls without the need for extraneous connecting elements and/or tools.

16. An animal cage according to claim 15, wherein said finger elements are pressed from said upwardly bent legs.

17. An animal cage according to claim 15, comprising a plurality of spaced finger elements pressed into each of said channels.

18. An animal cage according to claim 15, wherein the side walls and the bottom are integral and bent from a continuous sheet of welded wire mesh.

19. An animal cage according to claim 15, further including an opening for animal access in at least one of said end portions, a door moveable from a first position in which the opening is unobstructed and a second position in which the opening is obstructed by the door, and a settable trapping mechanism triggered by an animal entering the cage to cause the door to move from the first to the second position, the trapping mechanism including an elongated trigger rod having a central portion defining an axis extending along one of the side walls of the cage, end portions of said trigger rod being offset from said axis and adapted to set the door in the first position and to release the door for movement to the second position when the trigger rod is rotated about said axis, and portions of said downwardly bent leg forming one of said channels being bent upwardly to rotatably support said central portions of said trigger rod.

* * * * *